United States Patent
Bruls et al.

(10) Patent No.: US 11,480,786 B2
(45) Date of Patent: Oct. 25, 2022

(54) APPARATUS AND METHOD FOR GENERATING VIEW IMAGES

(71) Applicant: KONINKLIJKE PHILIPS N.V., Eindhoven (NL)

(72) Inventors: Wilhelmus Hendrikus Alfonsus Bruls, Eindhoven (NL); Christian Varekamp, Veldhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 16/960,575

(22) PCT Filed: Dec. 29, 2018

(86) PCT No.: PCT/EP2018/097144
§ 371 (c)(1),
(2) Date: Jul. 8, 2020

(87) PCT Pub. No.: WO2019/137821
PCT Pub. Date: Jul. 18, 2019

(65) Prior Publication Data
US 2020/0396436 A1    Dec. 17, 2020

(30) Foreign Application Priority Data
Jan. 12, 2018    (EP) .................................. 18151385

(51) Int. Cl.
*G02B 27/00*    (2006.01)
*H04N 13/117*    (2018.01)
(Continued)

(52) U.S. Cl.
CPC ......... *G02B 27/0093* (2013.01); *G02B 30/20* (2020.01); *G06T 15/20* (2013.01);
(Continued)

(58) Field of Classification Search
CPC .... G02B 27/0093; G02B 30/20; G06T 15/20; H04N 13/117; H04N 2013/0081;
(Continued)

(56) References Cited

U.S. PATENT DOCUMENTS

| 2007/0014347 A1 | 1/2007 | Prechtel et al. |
| 2010/0128121 A1* | 5/2010 | Wilkinson ............... H04N 5/92 348/135 |

(Continued)

FOREIGN PATENT DOCUMENTS

| WO | 2005031652 A1 | 4/2005 |
| WO | 2010013171 A1 | 2/2010 |
| WO | 2012176109 A1 | 12/2012 |

OTHER PUBLICATIONS

Eye Tracker downloaded from www.getlove.com on Jul. 7, 2020.
(Continued)

*Primary Examiner* — Nasim N Nirjhar (57) ABSTRACT

An apparatus for generating view images for a scene comprises a store (101) which stores three dimensional scene data representing the scene from a viewing region. The three dimensional scene data may e.g. be images and depth maps captured from capture positions within the viewing region. A movement processor (105) receives motion data, such as head or eye tracking data, for a user and determines an observer viewing position and an observer viewing orientation from the motion data. A change processor (109) determines an orientation change measure for the observer viewing orientation and an adapter (111) is arranged to reduce a distance from the observer viewing position relative to the viewing region in response to the orientation change measure. An image generator (103) generates view images for the observer viewing position and the observer viewing orientation from the scene data.

20 Claims, 7 Drawing Sheets

(51) Int. Cl.
  *G06T 15/20* (2011.01)
  *G02B 30/20* (2020.01)
  *H04N 13/00* (2018.01)
(52) U.S. Cl.
  CPC ... *H04N 13/117* (2018.05); *H04N 2013/0081* (2013.01); *H04N 2013/0085* (2013.01)
(58) Field of Classification Search
  CPC ......... H04N 2013/0085; H04N 13/279; H04N 13/366; H04N 13/383; G06F 3/011; G06F 3/012; G06F 3/013; G06F 3/0346
  See application file for complete search history.

(56) References Cited

U.S. PATENT DOCUMENTS

| | | | |
|---|---|---|---|
| 2012/0249797 A1* | 10/2012 | Haddick | G06F 3/016 348/158 |
| 2013/0235164 A1 | 9/2013 | Grover | |
| 2016/0286209 A1 | 9/2016 | Dolim et al. | |
| 2017/0150115 A1 | 5/2017 | Vandewalle et al. | |
| 2017/0230633 A1* | 8/2017 | Doh | H04N 13/122 |
| 2017/0363949 A1 | 12/2017 | Valente et al. | |
| 2019/0200058 A1* | 6/2019 | Hall | H04N 21/251 |
| 2019/0286230 A1* | 9/2019 | Sullivan | G06F 3/013 |

OTHER PUBLICATIONS

International Search Report and Written Opinion from PCT/EP2018/097144 dated May 6, 2019.
Thatte Jayant et al: "Depth augmented stereo panorama for cinematic virtual reality with focus cues", 2016 IEEE International Conference on Image Processing (ICIP), IEEE, Sep. 25, 2016 (Sep. 25, 2016), pp. 1569-1573.
Richardt Christian et al: "Megastereo: Constructing High-Resolution Stereo Panoramas", IEEE Computer Society Conference on Computer Vision and Pattern Recognition. Proceedings, IEEE Computer Society, US, Jun. 23, 2013 (Jun. 23, 2013), pp. 1256-1263.
Google Inc.:RenderingOmni-directionalStereoContent, Mar. 2015 (Mar. 2015), XP055463410, Retrieved from the Internet: URL:https://developers.google.com/vr/jump/rendering-ods-content.pdf [retrieved on Mar. 28, 2018].
Masayuki Tanimoto et al: "Free-Viewpoint TV", IEEE Signal Processing Magazine, IEEE Service Center, Piscataway, NJ, US, vol. 2 8, No. 1, Jan. 2011 (Jan. 2011), pp. 67-76, XP011340307, ISSN: 1053-5888, Doi: 10.1109/MSP.2010.939077 abstract p. 73.
T. Aykut et al "A Stereoscopic Vision System with Delay Compensation for 360 Remote Reality" Thematic Workshops 17 Oct. 23-27, 2017 Mountain View CA.
Google Inc "Rendering Omni-Directional Stereo Content" Mar. 2015.

* cited by examiner

APPARATUS AND METHOD FOR GENERATING VIEW IMAGES

CROSS-REFERENCE TO PRIOR APPLICATIONS

This application is the U.S. National Phase application under 35 U.S.C. § 371 of International Application No. PCT/EP2018/097144, filed on Dec. 29, 2018, which claims the benefit of EP Patent Application No. EP 18151385.4, filed on Jan. 12, 2018. These applications are hereby incorporated by reference herein.

FIELD OF THE INVENTION

The invention relates to generating view images for a scene, and in particular, but not exclusively, to generating view images for a virtual or augmented reality application.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction (the viewing pose) of the viewer, such as for example allowing the viewer to move and "look around" in the scene being presented.

Such a feature can specifically enable a virtual reality experience being provided to a user. This may allow the user to (relatively) freely move about in a virtual environment and dynamically change his position and where he is looking. Typically, such virtual reality applications are based on a three-dimensional model of the scene with the model being dynamically evaluated to provide the specific requested view. This approach is well known from e.g. game applications for computers and consoles, such as in the game category of first person shooters.

It is also desirable, in particular for virtual or augmented reality applications, that the image being presented is a three-dimensional image. Indeed, in order to optimize immersion of the viewer, it is typically preferred for the user to experience the presented scene as a three-dimensional scene. Indeed, a virtual reality experience should preferably allow a user to select his/her own position, camera viewpoint, and moment in time relative to a virtual world.

A major issue in supporting various services based on, in particular captured three dimensional, representations of a scene is that a large amount of data is required. This results in high resource requirements, such as a need for large storage resources.

In order to support many such new applications and services, it is desirable that a scene can be accurately captured. In contrast to traditional applications in which a single viewport for a single viewpoint is typically sufficient (e.g. traditional video sequences), it is desirable if the full 3D information in the scene can be accurately captured.

For example, with 6DoF (six degrees of freedom, corresponding to three degrees of freedom for the position of the viewpoint and three degrees of freedom for the orientation) virtual reality camera based capture, a scene is typically captured from multiple positions in multiple directions in order to capture accurate and complete information about the whole scene. During playback of 6DoF content from such a capture, a viewer can in many applications freely move within the scene with views dynamically being synthesized to correspond to the current virtual pose of the viewer. The presented views may e.g. be interpolated views that are synthesized from nearby originally captured views using suitable algorithms. This enables smooth transitions and/or reduces the required amount of captured light field data. Typically for such view interpolation, depth information is used for the synthesis with the depth information typically being captured directly or estimated from stereo images. Another example may be to use the captured views to develop a three-dimensional model of the scene.

In many applications, a static scene may be captured by moving a handheld camera. After the capture, the camera positions and viewing directions for the captured images are derived and used as base images for view synthesis or to generate a three-dimensional model for the scene.

However, in order for such a representation based on captured images to be sufficiently accurate, it is necessary that a sufficient amount of relevant information is captured by the images. This tends to require a relatively high spatial capture frequency/density which again leads to high resource requirements (e.g. storage and communication).

In some applications, such issues may at least partly be addressed by providing a more limited representation of the scene. For example, many virtual reality applications may provide a user with views of a scene which allows only restricted movement and orientation changes and which does not provide full freedom to move around in the scene. For example, a virtual reality application may be aimed at users that are relatively static (e.g. sitting or standing in a confined area, such as in front of a screen).

For such applications, the representation of a scene may be reduced to be based on captures from a relatively small region (or indeed from a single view position). For example, a scene may be captured from say, 25 positions arranged in a regular 5×5 grid with a total size of often less than 50 cm. Such a capture may provide a good capture of a scene for viewpoints within the capture region but also allows for generation of views for viewpoints that are at some distance thereto (e.g. up to a meter or less depending on the characteristics of the scene).

However, the quality of the generated view images tends to degrade with the distance from the capture region and e.g. artefacts, distortions, and errors resulting from de-occlusions and depth imperfections at the desired view point become increasingly significant. The problem is that it is not always easy or obvious for the user to know in which direction to move in order to be in the 'sweetspot' again. This will in practice tend reduce the perceived quality of the experience, which may result in the movement of the virtual observer being restricted by the application.

Hence, an improved approach for generating view images would be advantageous. In particular, an approach that allows improved and/or facilitated operation or implementation, improved user flexibility and freedom, reduced capture requirements, improved image quality, an improved user experience, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an apparatus for generating view images for a scene, the apparatus comprising: a store for storing three dimensional scene data representing the scene from a viewing region; a movement processor for receiving motion data for a user and for determining an observer viewing position and an observer viewing orientation from the motion data; a change processor for determining an orientation change measure for the observer viewing orientation; an adapter for reducing a distance from the observer viewing position relative to the viewing region in response to the orientation change measure; and an image generator for generating view images for the observer viewing position and the observer viewing orientation from the scene data.

The invention may provide improved operation, performance, and/or user experience in many embodiments and applications. The approach may in many applications provide an improved user experience with higher image quality from smaller amounts of scene data. In many embodiments, three dimensional view images (e.g. right eye and left eye images) may be generated for a scene based on scene data that is only captured within the viewing region. The view images may be generated to track the user movements and to reflect the pose changes. The system may in many cases provide both stereopsis and motion parallax despite being based on e.g. scene data in the form of an Omni Directional Stereo (ODS) representation of the scene. Furthermore, a bias of the observer viewing position towards the viewing region may achieve that generated view images have a higher image quality with typically less errors, artefacts and distortions. The bias may be restricted to times when the impact (e.g. in the form of inaccurate motion parallax) of the bias is least perceptible by the user.

The approach may for example allow a virtual or augmented reality experience in which the provided view images follow the user with correct stereopsis and parallax except for during times of a high rotational movement when the views are returned to the viewing region (e.g. providing a "rubber band" effect where the user is pulled towards the viewing region). Such a user experience has in practice been found to be highly attractive for many applications.

The adapter may be arranged to reduce the distance by modifying at least one of the observer viewing position and of at least one reference position for the viewing region.

The orientation change measure may be a rotational motion measure and may be indicative of a rotational component of the user movement, and may be independent of a translational component of the user movement. Motion may include acceleration, or indeed any change or order of derivative of a position.

The scene data may specifically be captured data and may specifically comprise captured images and depth data from a set of capture positions/poses within the viewing region.

The orientation change measure may be indicative of a size (e.g. within a time interval) or rate of change of the observer viewing orientation.

In accordance with an optional feature of the invention, the adapter is arranged to reduce the distance only if the orientation change measure exceeds a threshold.

This may provide improved operation and/or performance and/or may in many applications provide an attractive user experience. The approach may allow for the bias towards the viewing region to be applied when the resulting discrepancy between the user motion and the generated view images is less noticeable (or indeed not noticeable) by the user/viewer.

In accordance with an optional feature of the invention the adapter is arranged to gradually reduce the distance. This distance may be reduced to a certain value such that the observer is close enough to the view circle corresponding to the captured data/valid region. Said value may be zero.

This may provide an improved user experience in many scenarios and applications.

In accordance with an optional feature of the invention, a rate of reduction of the distance is a monotonically increasing function of the orientation change measure.

This may provide an improved user experience in many scenarios and applications. It may in many embodiments allow a stronger bias (e.g. "rubber banding") to the viewing region while maintaining low perceptibility of the resulting discrepancy between user movement and the generated view images.

In accordance with an optional feature of the invention, the adapter is arranged to impose an upper limit on the rate of reduction.

This may provide an improved user experience in many scenarios.

In accordance with an optional feature of the invention, the motion data comprises head motion tracking data.

The system may provide a very attractive user experience for applications that provide view images for a scene in dependence on the head movement. It may provide a virtual reality experience which may feel very realistic despite e.g. being based only on scene data captured in a relatively small region.

In accordance with an optional feature of the invention, the motion data comprises eye-pupil tracking data.

The system may provide a very attractive user experience for applications that provide view images for a scene in dependence on pupil movement. It may provide a virtual reality experience which may feel very realistic despite e.g. being based only on scene data captured in a relatively small region.

In accordance with an optional feature of the invention, the change processor is arranged to determine the orientation change measure in response to the relative movements indicated by the head motion tracking data and the eye-pupil tracking data.

The system may provide a particularly attractive user experience by considering both head tracking data and eye-pupil tracking data. For example, the relative movements of the head and eyes/pupils may be considered together to generate an effective gaze tracking with the orientation change measure reflecting orientation changes for the gaze. This may reduce the bias towards the viewing position when the head movement and the pupil movement compensate each other to reduce the overall change in gaze (the eye/pupil and head movements are in opposite directions). Similarly, the bias towards the viewing position may be increased when the head movement and the eye/pupil movement add up to increase the overall change in gaze (the eye/pupil and head movements are in the same direction).

In accordance with an optional feature of the invention, the adapter is arranged to reduce the distance by modifying coordinates for the three dimensional scene data.

This may in many embodiments facilitate operation and/or implementation. It may in many situations provide improved backwards compatibility and e.g. allow existing algorithms for determining the observer viewing orientation and observer viewing position from motion data, or for generating view images, to be reused with no or little modification.

In accordance with an optional feature of the invention, the three dimensional scene data is referenced to a first reference coordinate system and the observer viewing position is referenced to a second reference coordinate system, and adapter is arranged to modify the coordinates for the three dimensional scene data by changing a mapping from the first reference coordinate system to the second reference coordinate system.

This may in many embodiments facilitate operation and/or implementation.

In accordance with an optional feature of the invention, the three dimensional scene data comprises an Omni Directional Stereo with depth representation of the scene, and the adapter is arranged to reduce the distance by reducing the distance between the observer viewing position and a center position for a view circle for the Omni Directional Stereo with depth representation.

The approach may provide a realistic perception of the scene based on only an ODS and depth representation of the scene and may thus reduce storage and capture requirements substantially.

In accordance with an optional feature of the invention, the image generator is further arranged to generate view images for views not on the view circle by performing viewpoint shifting based on views on the view circle and the depth.

The approach may provide a realistic perception of the scene based on only an ODS and depth representation of the scene. It may allow view images to be generated which provide both stereopsis and motion parallax for movements that deviate from the view circle.

In accordance with an optional feature of the invention, the apparatus is arranged to execute a virtual reality or augmented reality application and wherein the view images are view images for an observer of the virtual reality or augmented reality application.

The invention may support or enable attractive virtual reality or augmented reality applications.

According to an aspect of the invention there is provided a method of generating view images for a scene, the method comprising: storing three dimensional scene data representing the scene from a viewing region; receiving motion data for a user and for determining an observer viewing position and an observer viewing orientation from the motion data; determining an orientation change measure for the observer viewing orientation; reducing a distance from the observer viewing position relative to the viewing region in response to the orientation change measure; and generating view images for the observer viewing position and the observer viewing orientation from the scene data.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to generation of view images for a virtual or augmented reality application. However, it will be appreciated that the invention is not limited to this application but may be applied in e.g. many different image processing and rendering applications.

Figure 1:
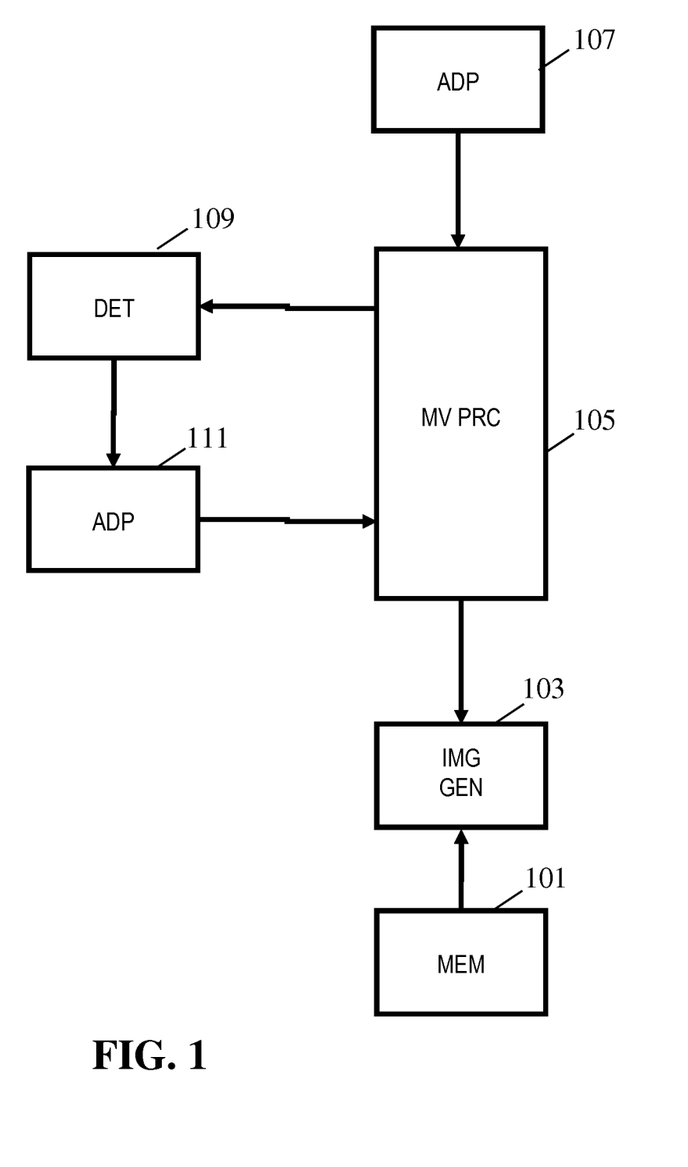
FIG. 1 illustrates an example of elements of a view image generating apparatus in accordance with some embodiments of the invention.

FIG. 1 illustrates an example of a view image generating apparatus in accordance with some embodiments of the invention. The view image generating apparatus is arranged to generate images corresponding to views of a scene for a given observer view pose. In many embodiments, the view image generating apparatus is arranged to generate stereo images for a given observer pose, or equivalently two images may be generated for slightly different observer poses corresponding to the offset between a viewer's two eyes.

In the field, the terms placement and pose are used as a common term for position and/or direction/orientation. The combination of the position and direction/orientation of e.g. an object, a camera, or a view may be referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following, the term pose is used to refer to a position and/or orientation which may be represented by one to six values (corresponding to the maximum possible degrees of freedom). The description will focus on embodiments and examples where a pose has the maximum degrees of freedom, i.e. three degrees of freedom of each of the position and the orientation resulting in a total of six degrees of freedom. The pose may thus be represented by a set or vector of six values representing the six degrees of freedom and thus the pose vector may provide a three-dimensional position and/or a three-dimensional direction indication. However, it will be appreciated that in other embodiments, the pose may be represented by fewer values.

The view image generating apparatus may for example be a server providing view images to a remote client in response to motion data received from the client. However, in the specific example of FIG. 1, the view image generating apparatus may be a local device, such as a personal computer, providing a virtual experience via a local display or displays of e.g. a locally connected head unit (e.g. a virtual reality headset/goggles).

In the example, the view image generating apparatus is arranged to generate the view images based on three dimensional scene data which represents the scene from a given viewing region. In some embodiments, the view region may be a single position or a one dimensional set of positions, such as positions for a set of images from cameras positioned on a line. In other embodiments, the viewing region may be a two dimensional area, such as images from a grid of view positions, or a three dimensional volume such as images from a cube of view positions.

It will be appreciated that the three dimensional scene data may be any scene data that allows representation of the scene from which images can be generated for other viewpoints. For example, the three dimensional scene data may include 3D model data or a grid/mesh with associated texture information. In the specific example, the three dimensional scene data comprises images for a set of viewing poses in a viewing region. In addition, depth information is included for the images, such as specifically by each image having an associated depth (/disparity) map.

The three dimensional scene data is in the example specifically captured data for a real world scene. The scene data may specifically comprise images captured for the scene from different positions and different directions. However, as generating captures for a large number of positions and directions tends to be very cumbersome and time consuming and requires substantial effort, the scene data includes only captures from a given viewing region (or capture region in the specific example of captured scene data) which may be relatively small.

Figure 2:
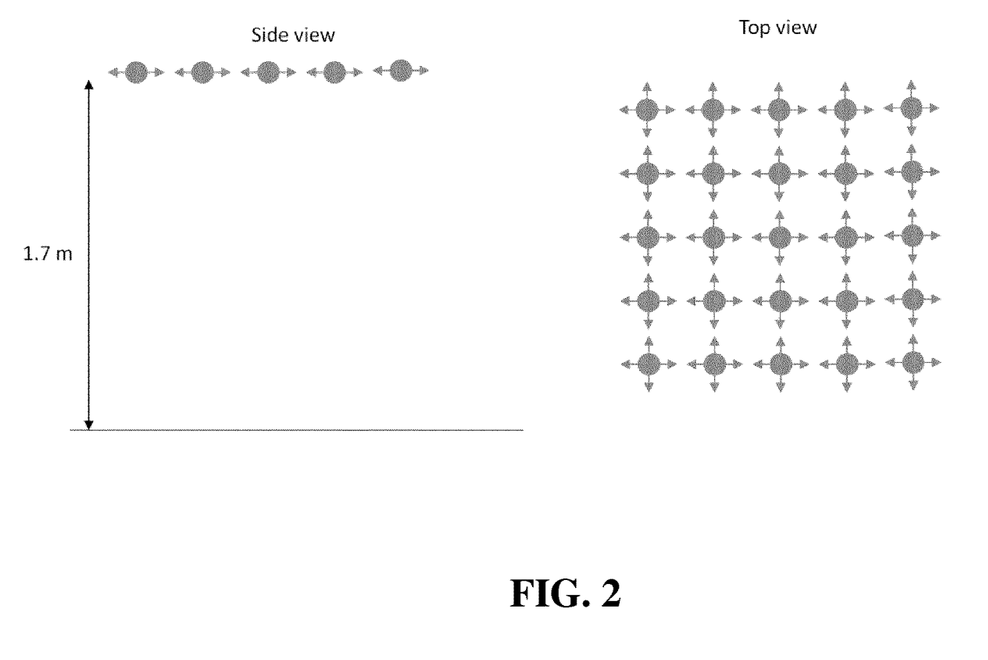
FIG. 2 illustrates an example of a capture pattern for a scene.

As a specific example of an embodiment, a capture of a scene may be performed using a pre-defined grid of anchor positions. In the example, the grid of virtual cameras forms a single horizontal plane above the ground surface. The pattern/grid of poses is illustrated in FIG. 2. In the figure, capture positions are visualized as spheres/circles with four arrows indicating four horizontal directions/orientations to be captured for each capture position. As shown, the grid may consist of 25 capture positions with four capture orientations for each position, resulting in a total of 100 capture poses. In the example, the grid is a horizontal grid which is approximately at eye height (1.7 m). (The example of FIG. 2 may be more suitable for sequential capture where a single camera is moved to the different capture positions. Using the capture pattern of FIG. 2 with multiple cameras at the same time would result in cameras blocking the views from other cameras. In such situations, a capture pattern corresponding e.g. to only the capture positions on the edge of the pattern may be more practical).

In the example, the height (e.g. the y direction) is constant for the capture positions whereas both the sideways (x) and the in/out (z) directions differ for different capture positions. Similarly, for the orientations, the y component is fixed whereas the x and z directions vary. Indeed, for the orientations, all capture directions are horizontal, and the rotation of the camera is also static (the image is horizontal) so the orientation can be expressed by a single variable, such as specifically the angle with respect to e.g. the x direction. Thus, in the example, the poses can be represented by a pose vector with three components.

The following description will focus on embodiments wherein the scene data is represented in accordance with a particular existing 3D image format known as Omni Directional Stereo (ODS). For ODS, the rays for the left- and right-eye image are created such that these rays have their origin on a circle with diameter typically equal to the pupillary distance of e.g. ~6.3 cm. For ODS, narrow angle image sections are captured for opposite directions corresponding to tangents of the view circle and at regular angular distances around the view circle (see FIG. 3)

Figure 3:
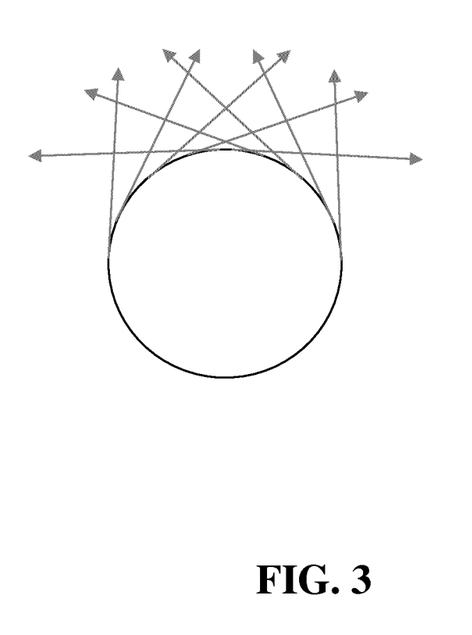
FIG. 3 illustrates an example of an Omni Directional Stereo representation.

For a given orientation (viewing angle) an image may be generated by combining the narrow angle image sections for directions that match the view directions within the viewport for the given orientation. Thus, a given view image is formed by combining the narrow angle image sections corresponding to the captures in different directions but with the different narrow angle image sections being from different positions on the circle. Thus, a view image is comprised of captures from different positions on the view circle rather than from only a single view point. However, if the view circle of the ODS representation is sufficiently small (relative to the contents of the scene), the impact of this can be reduced to acceptable levels. Further, as captures along a given direction can be reused for a number of different viewing orientations, a substantial reduction in the required amount of image data is achieved. The view images for a viewer's two eyes will typically be generated by captures in opposite directions for the appropriate tangents.

Figure 4:
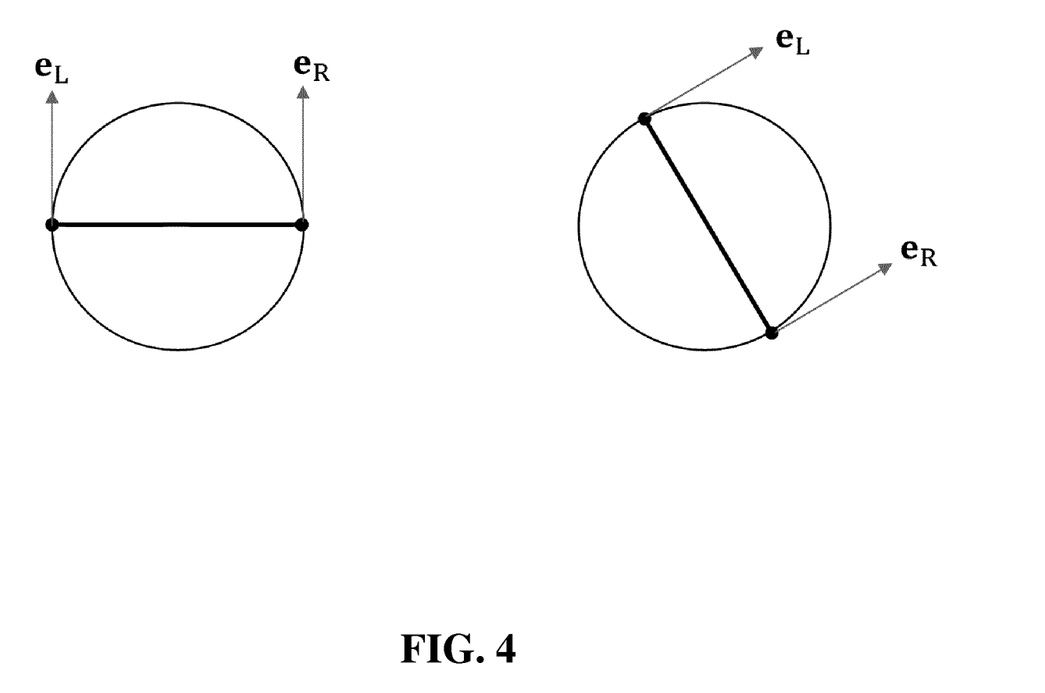
FIG. 4 illustrates an example of view poses relative to view circles for an Omni Directional Stereo representation of a scene capture.

An example of an ideal head rotation that can be supported by ODS is illustrated in FIG. 4. In the example, the head rotates such that both eyes move along a circle with diameter equal to pupillary distance. Assuming that this corresponds to the width of the ODS view circle, the view images for the different orientations can simply be determined by selecting the appropriate narrow angle image sections corresponding to the different view orientations.

However, for standard ODS, an observer will perceive stereopsis but not motion parallax. The absence of motion parallax tends to provide an unpleasant experience even with minor observer motions (in the order of a few centimeters). For example, if the viewer moves such that the eyes no longer fall exactly on the ODS view circle, such as illustrated in FIG. 4, generating view images based on simply selecting and combining the appropriate narrow angle image sections will result in the generated view images being the same as if the users eyes remained on the view circle, and accordingly the parallax that should result from the user moving his head will not be represented and this will result in the perception not being able to move relative to the real world.

In order to address this, and to allow for generation of motion parallax based on ODS data, the ODS format may be extended to include depth information. One narrow angle depth map section may be added for each narrow angle image section. This depth information may be used to perform view point shifting such that the generated images correspond to the new position outside (or inside) the view circle (e.g. each view image or narrow angle image section may be processed using a known image and depth based view point shift algorithm). For example, a 3D mesh may be created for each eye and rendering of the ODS data based on the meshes and textures for the left- and the right-eye can be used to introduce motion parallax.

However, such view shifting may introduce errors, artefacts and/or distortions and in order to achieve rendering without introducing especially distortions/stretches it will be required that the observer's eyes remain on the view circle.

Figure 5:
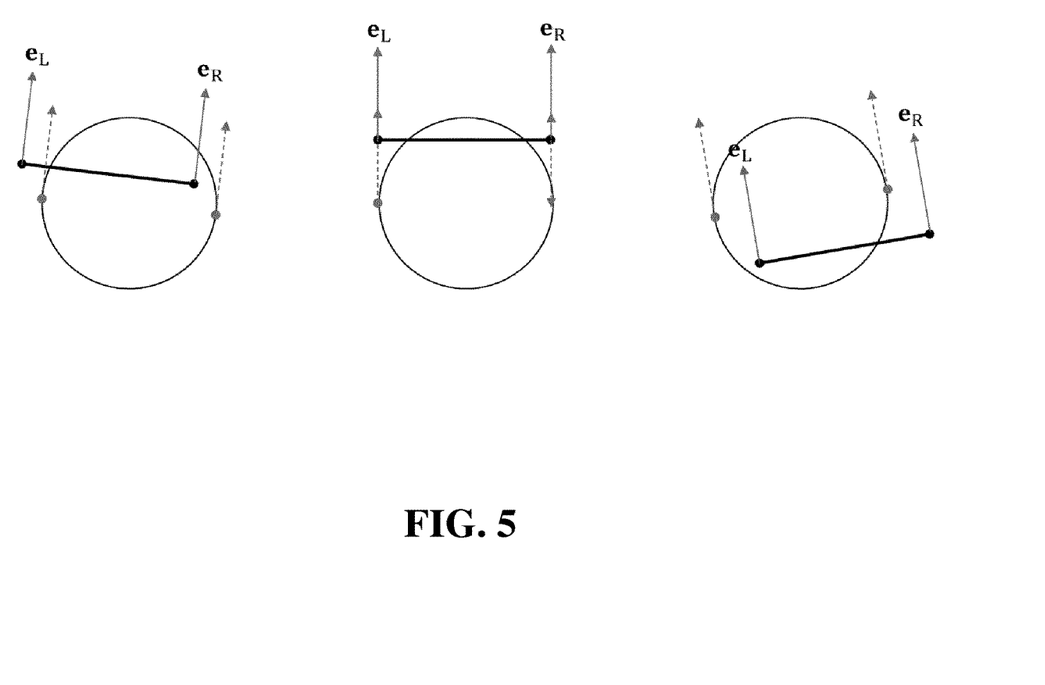
FIG. 5 illustrates an example of view poses relative to view circles for an Omni Directional Stereo representation of a scene capture.

When the viewer only changes position slightly via small head translations and/or rotations (as e.g. in the examples of FIG. 5), this approach may introduce the desired parallax while typically allowing the unwanted distortions to remain small. However, when the viewer makes larger movements, such as when starting to look around, his eyes will displace to a location that lies far away from the circle resulting in potentially large errors due to distortions and de-occlusions.

Figure 6:
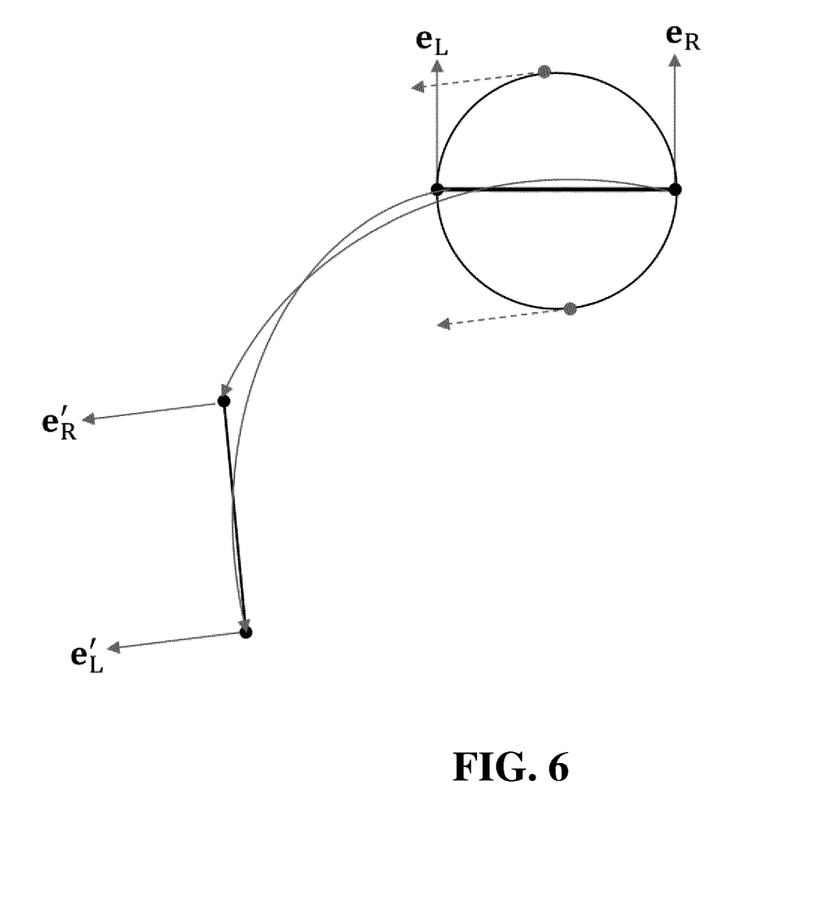
FIG. 6 illustrates an example of view poses relative to view circles for an Omni Directional Stereo representation of a scene capture.

An example of this is shown in FIG. 6 where an upper-body rotation or full body rotation may move the observer far away from the view circle corresponding to the captured data/valid region. The result is that unacceptable distortions will occur since the original rays (dashed arrows) need to be displaced over a large distance.

More generally, as it in practice tends to be costly and often not possible to use a large number of cameras/capture poses, practical approaches are often based on a limited spatial 3D region for which valid captured and processed 3D scene data is available. Rendering of images for viewpoints outside of this capture or viewing region is typically still possible based on the scene data, and specifically based on image and depth data. Thus, it is still possible to render images outside the viewing region but such viewpoint shifting risks introducing errors, artefacts, and distortions, such as e.g. stretches or incorrect de-occlusion.

This may result in a degraded user experience with reduced perceived quality and/or with restricted freedom for the user. For example, the user may be restricted to keep his head within a very small area in order to avoid significant degradation or a loss of natural perception (specifically a loss of natural parallax).

The view image generating apparatus of FIG. 1 employs an approach that may provide improved performance in many embodiments, and which specifically for many applications may provide an improved user experience with increased quality and/or user flexibility and freedom.

The view image generating apparatus comprises a store 101 which is arranged to store the three dimensional scene data representing the scene from the viewing region. In the specific example, the scene data comprises an ODS with depth representation. This ODS format has a left-eye texture with associated depth map, and the same for the right-eye. In total therefore four images, optionally packed together of which two represent depth. The ODS circle radius may be set to nominal 6.5 cm, but smaller or larger values may be selected depending on the content and use case.

The view image generating apparatus further comprises an image generator 103 which is generating view images for an observer viewing position and an observer viewing orientation from the scene data. Thus, based on an observer pose, the image generator 103 may proceed to generate a view image for respectively a right eye and a left eye.

In the specific example, the image generator 103 is arranged to generate the image for the given observer pose by first converting the depth map to a 3D mesh (vertices and edges) and then using standard texture mapping to generate a view image for the given new position. The skilled person will be aware of a number of known alternative techniques for such image synthesis, such as bump mapping, parallax mapping, etc., and this will for brevity accordingly not be discussed further.

The view image generating apparatus further comprises a movement processor 105 which is arranged to receive motion data for a user and for determining the observer viewing position and the observer viewing orientation from this motion data.

The motion data may be received from any suitable source and/or sensor and may represent motion in any suitable form. In the specific example, the movement processor 105 is coupled to a head unit 107 which is worn by the user and which comprises sensors, such as gyroscopes and acceleration sensors, that sense movement of the user's head.

The sensor data may in some embodiments be provided directly to the movement processor 105 which may proceed to determine the user's movement based on the received sensor data. However, in many embodiments, the head unit 107 may comprise functionality for processing the sensor data to e.g. directly provide data indicating e.g. translations, rotations, accelerations etc. Indeed, in some embodiments, the head unit may directly provide a user pose represented e.g. by a six dimensional vector providing three position and three orientation values.

Thus, as a user moves his head, the head unit 107 detects the movement and the movement processor 105 determines a corresponding observer pose and feeds it to the image generator 103 which generates corresponding view images for the eyes of an observer of the scene from this pose. The generated view images may be presented to the user, e.g. via a left eye display and right eye display comprised in the head unit. Thus, the user may be provided with a three dimensional view of the scene which may follow the movement of the user.

However, in the view image generating apparatus of FIG. 1, the observer position does not always exclusively follow the user movement. Rather, the view image generating apparatus comprises functionality for adapting the observer pose such that this is not a direct one to one mapping of the user movements. Rather, the observer pose may be biased towards the viewing region rather than freely following the user movement.

Specifically, the view image generating apparatus comprises a change processor 109 which is arranged to determine an orientation change measure for the observer viewing orientation. The orientation change measure may specifically be indicative of a speed, amount, or degree of change in the user orientation as indicated by the motion data. Thus, a larger and faster orientation change will typically result in a higher orientation change measure.

The orientation change measure reflects the change in orientation rather than position for the user, and may specifically be indicative of the rotation rather than translation of the user. Thus, the orientation change measure may be indicative of the rotational component but independent of the translational component of a user movement. For example, if the user pose is represented by N (e.g. 3) position values and M (e.g. 3) orientation values, the orientation change measure may be independent of the N position values and reflect at least one of the M orientation values. In some embodiments, the orientation change measure may be determined as a function of an angular rotational component of the user movement. The orientation change measure may be a rotational motion measure.

The change processor 109 is in the example coupled to the movement processor 105 and is arranged to receive the motion data from this. For example, the change processor 109 may continuously receive user orientation values (such as e.g. an azimuth angle) and continuously monitor a size and/or rate of change of this angle.

The change processor 109 is further coupled to an adapter 111 which is further coupled to the image generator 103. The adapter 111 receives the orientation change measure and in response it is arranged to adapt the processing such that a distance between the observer viewing position and the viewing region is reduced. The reduction in distance is dependent on the orientation change measure, for example in that the adaptation/reduction is only performed when the orientation change measure is indicative of a rate/size (e.g. within a predetermined time interval) that exceeds a given threshold.

As will be described in more detail later, different approaches may be used to reduce the distance based on the orientation change measure. In some embodiments, the adapter 111 may simply be arranged to modify the observer position such that this is moved closer to the viewing/capture region. For example, in many embodiments, the observer viewing position may be generated as relative movements from a given origin, and the adapter may be arranged to change the observer viewing position to correspond to a position in the viewing origin if the orientation change measure exceeds a threshold. The subsequent changes in the observer viewing position is then made relative to this new reference. The change in the reference position may be made without changing the viewing orientation.

Figure 7:
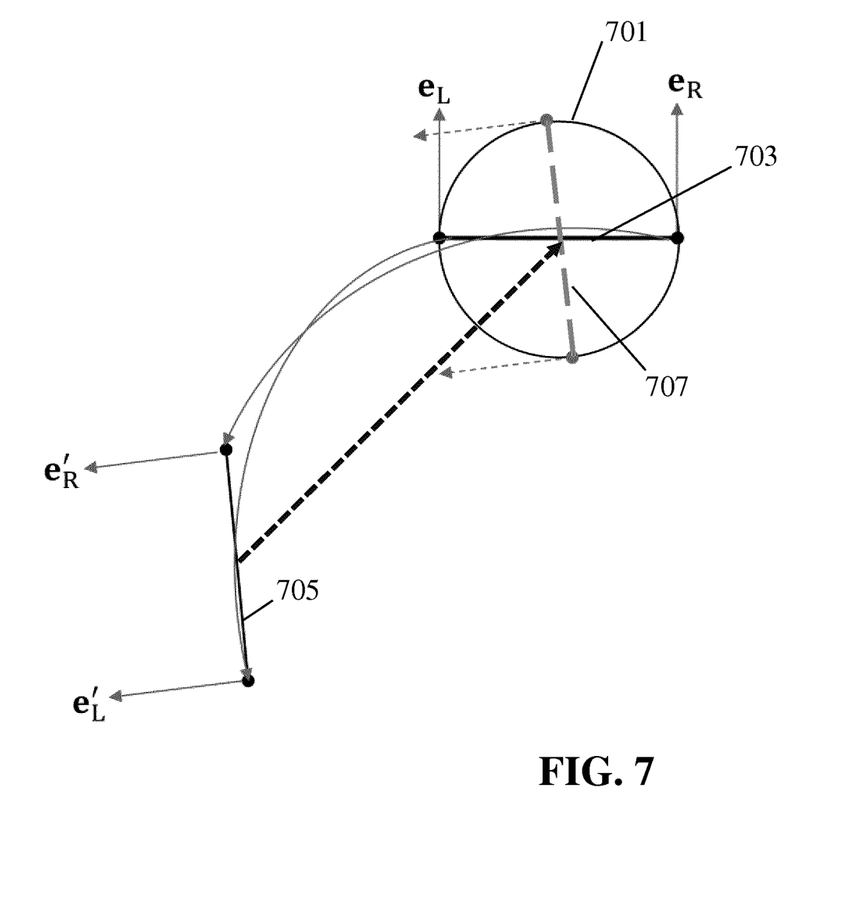
FIG. 7 illustrates an example of view poses relative to view circles for an Omni Directional Stereo representation of a scene capture.

A specific example is illustrated in FIG. 7. In this case, the user is originally positioned with the eyes on the view circle 701 of the stored ODS data. The image generator 103 accordingly generates view images for this first view pose 703 which happens to be centered on the center of the ODS view circle 701. As the user subsequently moves, the pose may change both in terms of the position and orientation. Accordingly, the movement processor 105 proceeds to track the observer viewing position and the observer viewing orientation, and the image generator 103 generates view images for these poses. Thus, as the user moves around, the images are updated to reflect the poses. As long as the movements are close to the ODS view circle 701, the resulting view images are relatively accurate and of high quality. However, as the user moves further away from the ODS view circle 701, distortions, errors and artefacts may become more significant.

However, if the image generator 103 of the view image generating apparatus detects that the orientation change measure exceeds a threshold, assumed to correspond to the user making a significant rotational movement, the adapter 111 adjusts observer viewing position such that this is biased towards the ODS view circle 701, and specifically if the orientation change measure is sufficiently large, the observer viewing position may be moved to the center of the ODS view circle 701. E.g. in the example of FIG. 7, a fast rotational movement may move the observer view pose from the start view pose 703 to the resulting view pose 705. However, due to the detection of the large rotational movement, the adapter 111 changes the observer viewing position to the center of the ODS view circle 701 resulting in the end view pose 707. This change in the observer viewing position is performed without any change in the observer viewing orientation. The image generator 103 then proceeds to generate view images for the end view pose 707.

The approach allows for the system to implement view shifting that may follow a user's movement, and especially for relatively small movements the user's movements may be followed. This provides a natural experience to the user and in particular provides a consistent and matching three dimensional perception with both stereopsis and, importantly, motion parallax. However, for a large rotational movement, the observer view pose is moved back to the view region (e.g. it may "snap" to the ODS circle) thereby ensuring that the observer viewing position is kept close to the region for which scene data is available. This allows for errors, artefacts, and distortions to be kept low.

For example, the view image generating apparatus may detect that a user is performing a head, upper- or full-body rotation and may in that situation modify the position of the scene relative to the observer viewing position during the rotation action such that when the observer ends his head-rotation action he will remain spatially closer to the valid viewing region (for which scene data is available).

The approach is based on the realization that the shifting of the observer viewing position is not only acceptable in many scenarios and applications but also that the impact and noticeability of this can be kept to a minimum by careful control of when the adjustment is performed. A change of the observer viewing position can be very disconcerting to a user as it corresponds to unnatural 3D cues such as a wrong or even opposite motion parallax etc. However, the current approach reflects the realization that such an unnatural behavior is effectively masked in the user's perception when this coincides with a large and/or fast change in orientation/rotational movement. In such a scenario, the visual cues to the user may change so fast that it is not fully processed, and the perceptual significance of unnatural cues are therefore masked (during these fast changes the user will not be able to track the visual objects/background and the bias or shift will thereby be much less perceptible and typically substantially unnoticed).

The approach may thus provide an experience where the user's view of a scene is biased towards (potentially essentially snapped to) a specific viewing region of the scene. The user may move his head around and the presented view images may follow this movement, yet the view image generating apparatus may move the viewing position back to the desired viewing region whenever suitable. Whereas such an approach may not suit e.g. virtual reality applications where the user has full freedom to move around in a virtual environment, it has been found to provide a very attractive user experience for applications in which the user is relatively static within the environment but still has some freedom to e.g. move his head around this more static position. In particular, it may provide both very high quality images, stereopsis and motion parallax depth cues, and a natural experience based on a low amount of scene data.

In the above example, the reduction of the distance between the viewing region and specifically the (center of) the ODS view circle, was achieved by a step change that directly reduced the distance to zero. However, it will be appreciated that in many embodiments, a more gradual bias towards the viewing region will be implemented.

For example, in some embodiments, the observer viewing position will be offset towards the viewing region by a certain rate, i.e. the offset or change introduced by the adapter 111 is gradually increased or changed to gradually move the observer viewing position towards the viewing region. The exact rate of change may e.g. be predetermined and the adapter 111 may be arranged to apply this bias towards the viewing region when the orientation change measure is indicative of a rotational movement above a given threshold.

In some embodiments, the rate at which the distance between the observer viewing position and the viewing circle is reduced depends on the value of the orientation change measure. Specifically, the rate of change may increase for an increasing orientation change measure, i.e. the faster the rotational movement of the user, the faster the shift or move towards the viewing region.

The rate of reduction of the distance may specifically be a monotonically increasing function of the orientation change measure. For example, the shift of the observer viewing position may be by a rate which is proportional to the value of the orientation change measure. Typically, a threshold may further be implemented such that the shift is only introduced if the orientation change measure is above a given level, and no shift is accordingly introduced for small or substantially translational movements.

In some embodiments, the rate may be a non-linear function of the orientation change measure. For example, no shift may be introduced for the orientation change measure being below a first threshold. For the orientation change measure being between a first and second threshold, a gradual dependency may be applied, such as e.g. the rate of change being proportional to the orientation change measure. For values of the orientation change measure above the second threshold, the adapter 111 may e.g. apply a step change, for example if the orientation change measure increases above a given level, the observer viewing position is reset to coincide with the center of the ODS view circle.

In some embodiments, the adapter 111 may be arranged to impose an upper limit on the rate of reduction. For example, the rate of change may be proportional with the orientation change measure until a given threshold at which no further increase in the rate of change is applied. This may ensure that the shift in position is maintained sufficiently low to be relatively imperceptible.

In many embodiments, the motion data may comprise head motion tracking data, e.g. from a virtual reality unit as previously described.

However, in some embodiments, the motion data may alternatively, or typically additionally, comprise eye-pupil tracking data (the tracking data may specifically be pupil tracking data reflecting movement of the pupil relative to the head).

For example, in some embodiments, the motion data may not only track head movement but also track the eye/pupil movement. In such cases, the orientation change measure may be determined to be indicative of both the head movement and the eye/pupil movement. For example, the observer viewing position may be moved to the center of the ODS view circle if either the head movement or the eye/pupil movement is detected to be above a given level.

However, typically, the head movement and eye/pupil movement are not considered independently but rather are combined into a single orientation change measure. The orientation change measure may specifically be determined in response to the relative movements indicated by the head motion tracking data and the eye-pupil tracking data. Specifically, a higher orientation change measure may be determined when the head movement and eye/pupil movement are detected to be in the same direction than when they are detected to be in opposite directions thereby compensating for each other (for example corresponding to a situation in which the user is turning his head while maintaining his view direction, i.e. moving his eyes to keep looking at the same object).

Indeed, in many embodiments, using an eye-pupil motion tracker may allow for better decisions on when and how to modify the observer viewing position relative to the viewing region. The eye/pupil tracking may for example be implemented by including infrared eye/pupil tracker sensors inside a virtual reality headset which can detect the movement of the eyes/pupils relative to the headset.

In such embodiments, whether the eyes e.g. are moving to right or above etc. can be detected/measured while at the same time the head movement can be detected by e.g. gyroscopes of the headset. It can accordingly be detected whether the motion of the eye/pupil is in the same direction as the motion of the headset or e.g. in the opposite direction (and thus 'compensating' for the head motion). In the latter case, no shift in the observer viewing position may be applied whereas in the former situation a stronger shift may be introduced as it becomes even harder for the user to notice such a shift.

In many embodiments, the tracking of the head motion and eye-pupil motion may be combined to directly track the gaze of the user and the orientation change measure may be determined from this gaze tracking. For example, the head and eye/pupil motion data may be combined into, e.g. a 3 component vector reflecting the orientation of the current gaze of the user. The orientation change measure may then be generated to reflect the change in this gaze vector. Thus, adjustments may be applied when (and only when) the orientation change measure indicates that the orientation of the gaze of the user is changing by a rate above a given threshold.

In some embodiments, differentiated operation may also be performed depending on the relative motion of the head and the eyes. For example, a different action may be taken if the head is not rotating but the eyes are quickly changing direction. In that case, a small bias or shift towards the viewing region could be applied. If both head rotation and gaze rotation are small, then no adjustment is applied.

The previous description focused on examples where the adjustment was introduced by changing or offsetting the observer viewing position. However, it will be appreciated that in other embodiments, the reduction of the distance between the observer viewing position and the viewing region may be achieved by additionally or alternatively changing other parameters, such as the coordinates or coordinate references for other entities.

Specifically, the adapter 111 may in some embodiments be arranged to reduce the distance by modifying coordinates for the three dimensional scene data. Thus, rather than change the observer viewing position, the coordinates of other scene elements may be changed. This may be attractive in many embodiments where e.g. the motion tracking, observer viewing position determination, and image generation are based on established algorithms that may be difficult to adapt. In many practical implementations, a more efficient approach may be to actually adapt the scene coordinates. Specifically, in many embodiments, the scene data may comprise of one or more captured images from a set of viewing positions. E.g. for an ODS approach, the scene data may comprise ODS images together with a coordinate representation for the ODS view circle. In many embodiments, it may be computationally more efficient to reduce the distance by modifying the coordinates of the scene data, such as the coordinates of the ODS view circle rather than to modify the observer viewing position.

In many embodiments, the system may use different coordinate systems for different aspects/entities/parameters. For example, the scene data may be stored with coordinates represented in a coordinate system adopted at the time of generation of the scene data (e.g. when captured). This coordinate system may be a first reference coordinate system which may e.g. be referred to as a scene coordinate system. The coordinates of the viewpoints for the captured images are represented with reference to this scene coordinate system.

The motion data may however be provided with respect to the movement of the user in the real world and is thus not initially related to the scene coordinate system. In many embodiments, the motion data is processed to generate motion information and viewing poses with respect to a second reference coordinate system, which may be referred to as the world coordinate system. In many embodiments, it may be practical to process the motion data and to generate the observer viewing position in this world coordinate system.

In order to harmonize the different parameters, the two reference coordinate systems may be mapped to each other. As a simple example, in many embodiments, the scene coordinate system and the world coordinate system may be set to have the same origin (and the same scale).

However, in many embodiments, the adaptation of the observer viewing position relative to the viewing region may be achieved by dynamically changing the mapping between the two reference coordinate systems. Specifically, the offset between the scene and the world coordinate system may be changed. This may for example be changed by changing the coordinates of the origin of the scene coordinate system in the world coordinate system. As a specific example, if the orientation change measure is sufficiently high, the origin of the scene coordinate system in the world coordinate system will be set such that the center of the ODS view circle coincides with the current observer viewing position.

In the following a specific example of an implementation will be described. For this description, let $\omega$ [rad/s] denote the magnitude of the angular velocity that the head unit has at a given moment in time. Above a given minimum angular velocity magnitude, $\omega_{min}$ [rad/s] the orientation change measure indicates that the user is starting a head-rotation action. More sophisticated mechanisms could use a longer history of the pose of the head unit to recognize whether the observer has started a head rotation.

Once the head-rotation has been detected, the scene reference coordinate system is displaced to follow the observer viewing position in order to keep the ray displacements constant or even decrease these. Once the user stops rotating ($\omega \leq \omega_{min}$) the scene reference coordinate system stops translating. After this moment, view images are dynamically generated to reflect the current observer viewing position and thus motion parallax is presented.

The time during the head-rotation is used to decrease the difference between the observer viewing position and the view region. Let $x_{scene}$ denote the position of the scene coordinate system origin in the world coordinate system and with the viewing region being centered on this origin. Typically $x_{scene}$ will coincide with the world coordinate system origin when starting the application.

Depending on the angular velocity indicated by the orientation change measure, the view image generating apparatus now constantly updates the scene in a state-loop that determines the observer viewing position, $x_{observer}$, from the sensors of the head unit:

$$x_{scene} \leftarrow \frac{\alpha}{f} x_{observer} + \left(1 - \frac{\alpha}{f}\right) x_{scene},$$

where $\alpha$ is a 'pull-factor' that determines how strong the scene/viewing region is pulled towards the current observer viewing position (i.e. specifically how fast the reduction in distance between the viewing region and the observer viewing position is), and f is the update frequency [Hz] of the pose measurement system. For a higher update frequency, the scene coordinate system needs to be translated less, or in other words, a 'pull-factor' $\alpha$ may be specified independent of the update frequency of the pose measurement system. It can be seen from the above equation that $x_{scene}$ is, in principle, constantly updated. However, the scene position change is only greater than zero when the angular head-velocity exceeds a given threshold ($\omega \geq \omega_{min}$).

The 'pull-factor' $\alpha$ may depend on the angular velocity and on a gain K [rad$^{-1}$] which determines how the velocity difference $\omega - \omega_{min}$ modifies a 'pull-factor' $\alpha$:

$$\alpha \equiv \begin{cases} \min(K(\omega - \omega_{min}), 1) & \text{if } \omega > \omega_{min} \\ 0 & \text{otherwise} \end{cases}$$

As can be seen in this equation, when $\omega \leq \omega_{min}$, the 'pull-factor' $\alpha = 0$ and as a consequence the scene position is not modified. The observer can in that case move arbitrary far from the ODS view circle. If gain K becomes large, then $\alpha$ becomes 1 already for a small angular velocity difference $\omega - \omega_{min}$. The effect is then that the viewing region is immediately pulled toward the observer viewing position and the distortion quality of the generated view images will improve. A possible value for $$\omega_{min} = \frac{\pi}{8} \text{rad/s}$$

which is an angular speed at which an observer would rotate his head over an angle of 90 degree in four seconds. If it is assumed that at four times this speed, the distance should be reduced to zero then $$K(\omega - \omega_{min}) = 1$$
$$K\left(\frac{4\pi}{8} - \frac{\pi}{8}\right) = 1$$
$$K = \frac{8}{3\pi}.$$

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc. do not preclude a plurality. Reference signs in the claims are provided merely as a clarifying example and shall not be construed as limiting the scope of the claims in any way.

The invention claimed is:

1. An apparatus for generating view images for a scene, the apparatus comprising:
   a memory circuit,
      wherein the memory circuit is arranged to store three dimensional scene data,
      wherein the three dimensional scene data represents the scene from a viewing region, and
      wherein the three dimensional scene data comprises an Omni Directional Stereo with depth representation of the scene at the viewing region;
   a movement processor circuit,
      wherein the movement processor circuit is arranged to receive motion data,
      wherein the motion data is associated with a motion of a user,
      wherein the movement processor circuit is arranged to determine an observer viewing position and an observer viewing orientation from the motion data;
   a change processor circuit, wherein the change processor circuit is arranged to determine an orientation change measure for the observer viewing orientation;
   an adapter circuit,
      wherein the adapter circuit is arranged to reduce a distance between the observer viewing position and a center position for a view circle for the Omni Directional Stereo with depth representation at the viewing region in response to the orientation change measure,
      wherein reducing the distance moves the observer viewing position closer to the viewing region; and
   an image generator circuit,
      wherein the image generator circuit is arranged to generate view images at the observer viewing orientation from the observer viewing position at the reduced distance using the three dimensional scene data.

2. The apparatus of claim 1, wherein the adapter circuit is arranged to reduce the distance only when the orientation change measure exceeds a threshold.

3. The apparatus of claim 1, wherein the adapter circuit is arranged to gradually reduce the distance.

4. The apparatus of claim 1, wherein a rate of reduction of the distance is a monotonically increasing function of the orientation change measure.

5. The apparatus of claim 4, wherein the adapter circuit is arranged to impose an upper limit on the rate of reduction.

6. The apparatus of claim 1, wherein the motion data comprises head motion tracking data.

7. The apparatus of claim 1, wherein the motion data comprises eye-pupil tracking data.

8. The apparatus of claim 1,
   wherein the motion data comprises head motion tracking data,
   wherein the motion data comprises eye-pupil tracking data,
   wherein the change processor circuit is arranged to determine the orientation change measure in response to relative movements indicated by the head motion tracking data and the eye-pupil tracking data.

9. The apparatus of claim 1, wherein the adapter circuit is arranged to reduce the distance by modifying coordinates for the three dimensional scene data.

10. The apparatus of claim 1,
    wherein the three dimensional scene data is referenced to a first reference coordinate system,
    wherein the observer viewing position is referenced to a second reference coordinate system,
    wherein adapter circuit is arranged to modify a first reference coordinate and a second reference coordinate for the three dimensional scene data by changing a mapping from the first reference coordinate system to the second reference coordinate system.

11. The apparatus of claim 10, wherein the image generator circuit is arranged to generate view images for views not on the view circle by performing viewpoint shifting based on views on the view circle and the depth.

12. The apparatus of claim 1,
    wherein the apparatus is arranged to execute a virtual reality or augmented reality application,
    wherein the view images are view images for an observer of the virtual reality or augmented reality application.

13. A method of generating view images for a scene, the method comprising:
    storing a three dimensional scene data,
    wherein the three dimensional scene data comprises an Omni Directional Stereo with depth representation of the scene,
    wherein the three dimensional scene data represents the scene from a viewing region;
    receiving motion data for a user;
    determining an observer viewing position and an observer viewing orientation from the motion data;
    determining an orientation change measure for the observer viewing orientation;
    reducing a distance between the observer viewing position and a center position for a view circle for the Omni Directional Stereo with depth representation in response to the orientation change measure to move the observer viewing position closer to the viewing region; and
    generating view images at the observer viewing orientation from the observer viewing position at the reduced distance using the three dimensional scene data.

14. A non-transitory computer readable medium storing instructions for generating view images for a scene, wherein when executed on a processor, cause the processor to:
    store a three dimensional scene data,
    wherein the three dimensional scene data comprises an Omni Directional Stereo with depth representation of the scene,
    wherein the three dimensional scene data represents the scene from a viewing region;
    receive motion data for a user;
    determine an observer viewing position and an observer viewing orientation from the motion data;
    determine an orientation change measure for the observer viewing orientation;
    reduce a distance between the observer viewing position and a center position for a view circle for the Omni Directional Stereo with depth representation in response to the orientation change measure to move the observer viewing position closer to the viewing region; and generate view images at the observer viewing orientation from the observer viewing position at the reduced distance using the three dimensional scene data.

15. The method of claim 13, further comprising reducing the distance only when the orientation change measure exceeds a threshold.

16. The method of claim 13, further comprising gradually reducing the distance.

17. The method of claim 13, wherein a rate of reduction of the distance is a monotonically increasing function of the orientation change measure.

18. The method of claim 17, further comprising imposing an upper limit on the rate of reduction.

19. The method of claim 13, wherein the motion data comprises head motion tracking data.

20. The method of claim 13, wherein the motion data comprises eye-pupil tracking data.

\* \* \* \* \*